May 26, 1953
C. B. RICHEY
2,639,575
SIDE DELIVERY RAKE
Original Filed Nov. 12, 1949
4 Sheets-Sheet 1
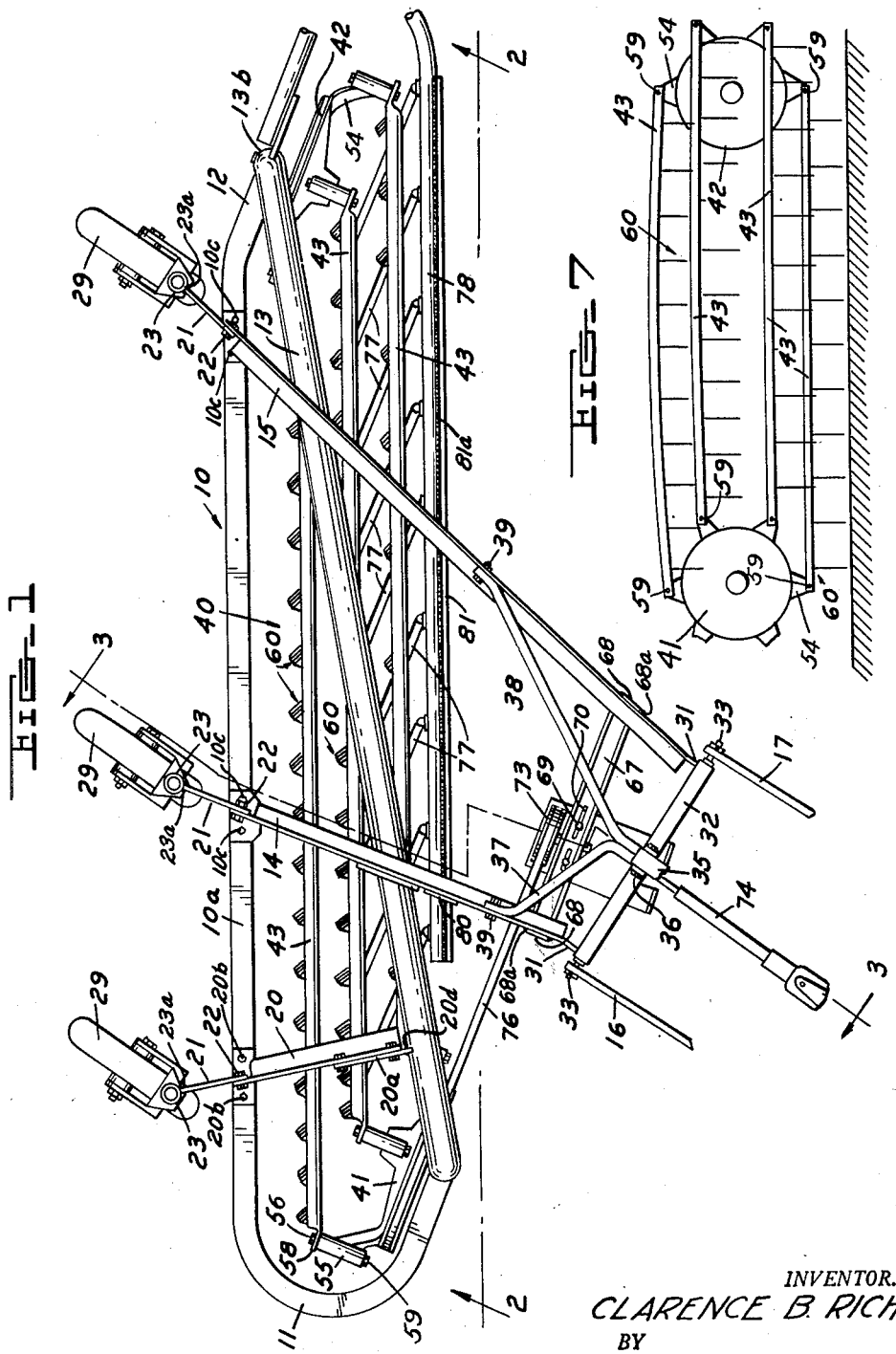
INVENTOR.
CLARENCE B. RICHEY
BY
*W. A. Schaich*
ATTORNEY

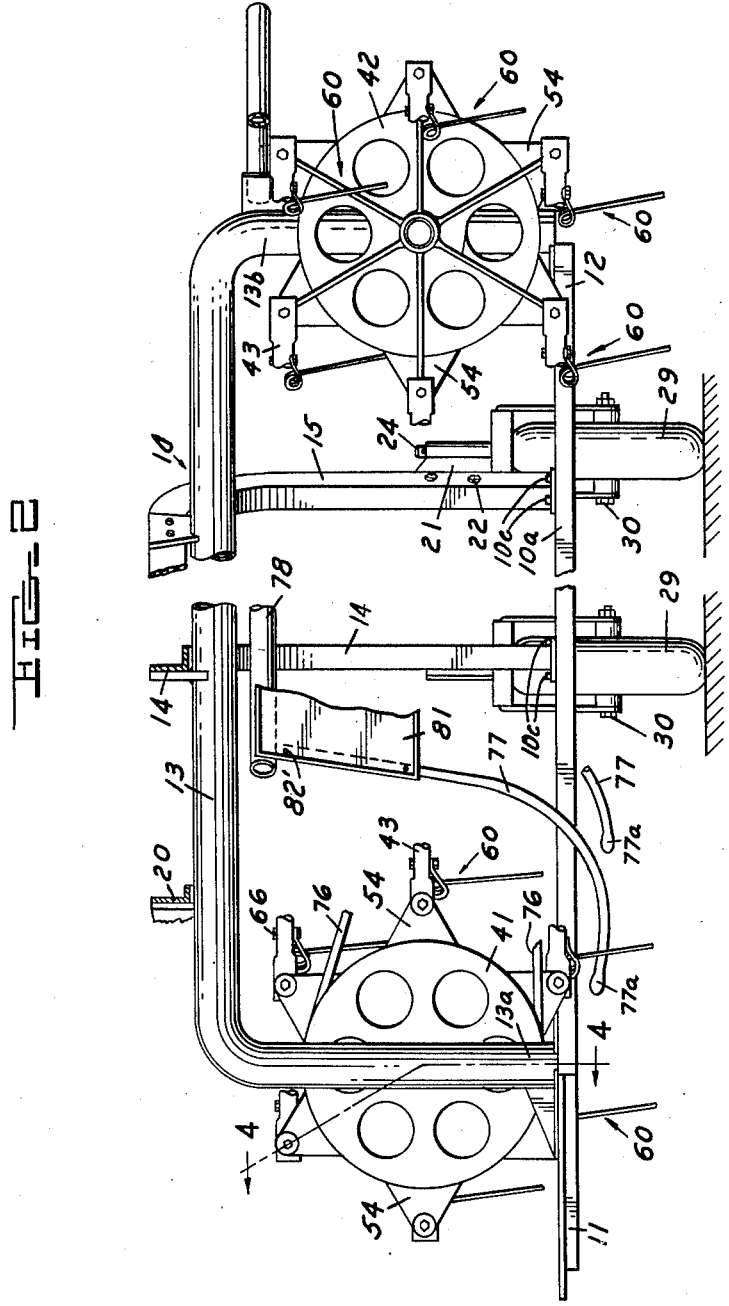

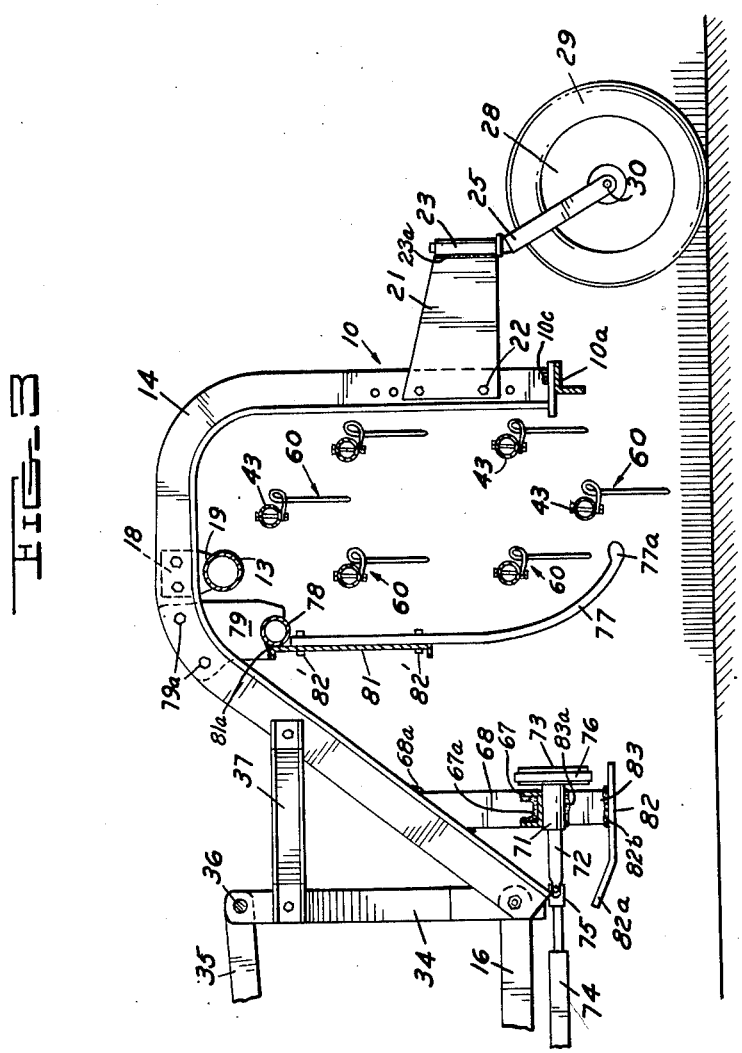

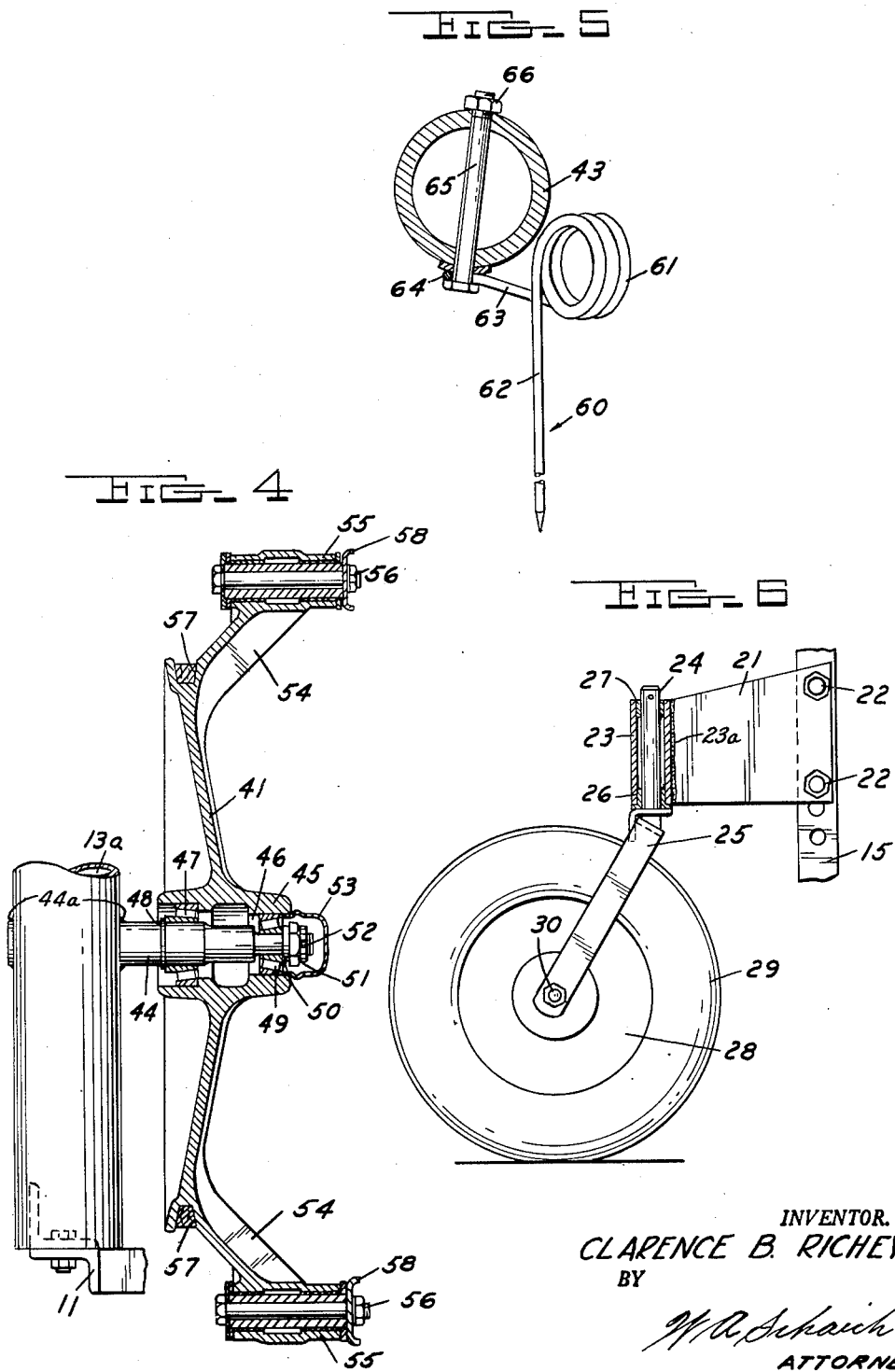

Patented May 26, 1953

2,639,575

UNITED STATES PATENT OFFICE 2,639,575

SIDE DELIVERY RAKE

Clarence B. Richey, Royal Oak, Mich., assignor to Dearborn Motors Corporation, Birmingham, Mich., a corporation of Delaware Original application November 12, 1949, Serial No. 126,800. Divided and this application February 7, 1951, Serial No. 209,727

5 Claims. (Cl. 56—377)

This application is a division of my co-pending application, Serial No. 126,800, filed November 12, 1949, and entitled Side Delivery Rake.

This invention relates to a side delivery rake, and particularly to a side delivery rake for use with tractors having power-lifted, trailing hitch links.

Side delivery rakes have been in use for some time and are well liked because of their ability to deliver the mowed hay into a single window which not only facilitates the curing of the hay but also permits the convenient pick up of cured hay by buck rake, hay balers or other implements. Many of such side delivery rakes, however, are of relatively complicated construction and had limited service life. Nearly all of the known side delivery rakes utilize a raking drum or cylinder comprising spaced rotatable discs between which are attached rake tooth bars carrying spaced rake teeth. Spaced hay strippers are then provided comprising semi-circular tubes depending from the frame of the hay rake and passing between the rotary paths of the rake teeth. The purpose of such strippers is to strip the hay from the teeth of the rotating raking cylinder. One of the ever present disadvantages of such construction, however, is the great possibility of interference of the rake bars with the hay strippers as the raking cylinder is rotated. Such interference is caused by the radially outward deflection of the raking bar due to the centrifugal forces set up by the rapidly rotating raking cylinder and the deflection reaches a maximum in the lowermost position of each rake bar where gravity is also acting to deflect the rake bar outwardly. A further and more serious disadvantage caused by deflection of the tooth bar is the unevenness with which the raking teeth traverse the ground due to the teeth at the point of greatest deflection digging into the ground.

Accordingly, it is an object of this invention to provide an improved side delivery rake of a simple, rugged yet economically manufacturable design.

A particular object of this invention is to provide an improved frame construction for a side delivery rake adapted for use with a tractor having power lifted hitch links.

Another object of this invention is to provide an improved design of a rake tooth bar for a rotating raking cylinder of a side delivery rake which eliminates the possibility of interference between the hay stripper and the raking teeth normally caused by the combination of centrifugal and gravitational forces produced in the rapidly rotating raking cylinder during operation.

A further object of this invention is to provide an improved rake tooth bar for a rotating raking cylinder of a side delivery rake which insures that the raking teeth of each bar will be evenly aligned at the bottom of the rotating cylinder to eliminate uneven raking caused by deflection of such bar by the combination of centrifugal and gravitational forces produced in the rapidly rotating cylinder.

Still another object of this invention is to provide an improved hay stripper for a side delivery rake having a rotating raking cylinder.

The specific nature of this invention, as well as other objects and advantages thereof, will become apparent to those skilled in the art from the following detailed description taken in conjunction with the attached drawings on which, by way of preferred example only, is illustrated one embodiment of this invention:

On the drawings:

Fig. 1 is a plan view of the side delivery rake constructed in accordance with this invention.

Fig. 2 is a cross sectional view taken along the plane 2—2 of Fig. 1.

Fig. 3 is a cross sectional view taken along the plane 3—3 of Fig. 1.

Fig. 4 is a cross sectional view taken along the plane 4—4 of Fig. 2.

Fig. 5 is an enlarged detail view, partly in section, showing the manner of securing the rake tooth to the rake bar.

Fig. 6 is an enlarged detail view, partly in section, showing the manner of mounting the wheels to the frame of the side delivery rake.

Fig. 7 is a schematic view showing the camber of the rake tooth bars of the raking cylinder, in exaggerated detail, at both the top of the rotating cylinder and at the bottom of the cylinder.

As shown on the drawings:

Briefly, this invention comprises a tractor drawn frame in which there is rotatably mounted a so-called raking cylinder formed by a plurality of rake tooth bars which rotate about a horizontal axis inclined relative to the path of travel of the tractor. The rear end of the frame is supported on caster type wheels while the front end of the frame is adapted for mounting on the trailing hitch links of a tractor of well-known make. The power-take-off shaft of the tractor is utilized for driving the raking cylinder through the medium of a V-belt and suitable pulleys.

In Fig. 1 there is shown in assembled relation, a side delivery rake constructed in accordance with this invention. A frame 10 is utilized to support the elements of the side delivery rake. Frame 10 comprises a horizontally disposed bottom member 10a constructed preferably of angle iron and having a substantially C-shaped configuration in a horizontal plane with rounded ends 11 and 12 respectively. A vertically disposed tubular frame element 13 of generally U-shaped configuration is diagonally secured across the oval shaped bottom portion of frame 10, as best shown in Fig. 1. A pair of vertically disposed frame carrying members 14 and 15 are secured, preferably by bolts 10c, in laterally spaced relationship to the bottom portion 10a of frame 10 as shown in Figs. 1, 2 and 3. The carrying members 14 and 15 are of generally inverted U-shape, passing over the top of tubular portion 13 of frame 10 and extending forwardly and downwardly to where connection is made to the vertically swingable draft links 16 and 17 of the tractor (not shown), as will be later described. Each of the carrying members 14 and 15 are secured to tubular portion 13 of frame 10 by a depending plate 18 bolted or otherwise secured to each carrying member 14 and 15 and welded to the tubular portion 13 of frame 10 as shown at 19. A third frame carrying member 20 has its ends respectively secured by bolts 20b to bottom frame portion 10a and the tubular portion 13 of frame 10 near the left end of such frame as viewed in Fig. 1, a bracket 20a being secured by welding, as indicated at 20d, to such tubular portion for such purpose.

A web-like arm 21 is secured to each of the respective carrying members 14, 15, and 20 by bolts 22. Each arm 21 projects rearwardly of frame 10 and a vertically disposed tubular housing 23 is welded, as indicated at 23a, to the rear end of each of such arms. Housing 23 is provided to journal a shaft 24 of a wheel supporting fork 25. Suitable sleeve bearings 26 and 27 (Fig. 6) are provided in opposite ends of the housing 23 to support shaft 24 in bearing relationship. A wheel 28 provided with a rubber tire 29 thereon is rotatably supported in fork 25 by a transverse axle 30 and similar wheels are similarly mounted on each of the other two frame carrying members to support the rear edge of frame 10.

Frame carrying members 14 and 15 converge at their forward ends and such ends are suitably apertured to respectively receive horizontal pins 33. A pair of vertical opposed strap members 32 spaced slightly apart at the top diverge downwardly to define an A-shaped strut 34. The strap members mounted on 32 are pins 33, suitable apertures being provided at the lower ends of the strap members 32 for such purpose. The draft links 16 and 17 of the tractor are also mounted on pins 33. The top tractor link is pivotally secured between the spaced upper ends of the straps 32 by a transverse pin 36. A pair of horizontally disposed braces 37 and 38 are connected at their forward ends to strut 34 just below the connecting pin 36 and the other ends of braces 37 and 38 are connected respectively to carrying members 14 and 15 respectively by bolts 39. Thus the forward end of the rake is supported by the draft links 16 and 17 of the tractor and since the vertical position of the draft links 16 and 17 may be hydraulically controlled in conventional fashion, the front end of the rake may be raised or lowered with respect to the ground for a purpose which will later appear.

It should be pointed out here that the axis of frame 10 is diagonally disposed with respect to the line of draft of the tractor when the carrying frame members 14 and 15 are mounted on drawbar 32.

A raking cylinder 40 is rotatably mounted in frame 10. Such raking cylinder comprises a pair of end wheels or discs 41 and 42 to which are secured a plurality of rake tooth bars 43 as will be presently described. Disc 41 is rotatably mounted on the upright leg 13a of tubular frame portion 13 by a stub axle 44. Stub axle 44 is horizontally supported within a suitable hole in upright portion 13a and is welded, as indicated at 44a, to the upright portion of frame member 13. Disc 41 is provided with a hub 45 having an axial bore 46 therethrough. The left end of bore 46, as shown in Fig. 4, is counterbored to receive a tapered roller bearing 47 which surrounds axle 44 and abuts a stationary shoulder or collar 48 on axle 44. Another bearing 49 similar to bearing 47 is placed in the other end of bore 46 and surrounds the forward end of axle 44. A washer 50 and nut 51 are placed over the threaded forward end 52 of axle 44 to secure disc 41 to such axle. A suitable cap 53 is forced into the right hand end of bore 46 to exclude extraneous matter from the bearing.

A plurality of radially disposed arms 54 are angularly spaced about the periphery of disc 41 and on the end of each arm 54 there is provided a horizontally disposed housing 55, such housing being provided with a bore 56, the axis of which is disposed parallel to the axis of axle 44. It should be noted that axle 44 is mounted on frame member 13a in such a way that disc 41 will be displaced at an acute angle to the longitudinal axis of frame 10. A peripheral V-shaped groove 57 is provided in disc 41 for a purpose to be later described. A second disc 42, similar to disc 41, is mounted in a similar manner to that of disc 41 on the upright portion 13b of frame member 13 and such disc is disposed with its face parallel to the face of disc 41.

A plurality of tubular rake bars 43 are pivotally secured between discs 41 and 42 in a cylindrical array. The respective ends of each rake bar 43 are cut down and flattened as shown at 58 in Figs. 1 and 4 and a transverse hole is provided in such respective end portions through which is inserted a bolt 59. Such bolt extends through bore 56 of housing 55 and is supported therein in bearing relationship. A nut 60 secures such bolt within housing 55.

Each rake bar is provided with a plurality of depending rake teeth 60 secured in evenly spaced relationship upon the bar. Such teeth comprise a coil spring portion 61, one end of which projects downwardly to form a vertically disposed tine 62. The other end of the coil spring 61 terminates in an arm-like portion 63 on the end of which there is provided an eye 64. Each tooth 60 is secured to the underside of rake bar 43 by a substantially vertical bolt 65 which passes through eye 64 and thence through suitable holes in bar 43 and a nut 66 secures such bolt to bar 43.

As tooth bars 43 are pivotally mounted on discs 41 and 42 the rake teeth 60 rotate about the cylinder with tines 62 vertically disposed at all times.

In accordance with this invention, each rake bar 43 is provided with a camber, shown in exaggerated detail in Fig. 7 to better illustrate such feature. The camber is such that each rake tooth bar 43 is bowed upwardly; that is, when each rake tooth is at the top position of the raking cylinder, the center of each of such bars is displaced above the ends of the bar. Hence when rotated slowly, the central portions of each rake bar 43 would remain in such bowed position as it passes through the lower portions of its path. As the raking cylinder 40 rotates the rake tooth bars are carried around the cylinder as well as being substantially laterally advanced and then retracted relative to the ground. The lateral movement is due to the angular disposition of the discs 41. When rotated rapidly at working speeds, the centrifugal force on the rake bar will, of course, act to deflect the central portions of the bar radially outwardly and such tendency will be directly in opposition to the aforementioned camber throughout the lowermost portions of the rotary path of the rake bar. Therefore the rake bars are bowed or cambered as above described in sufficient degree to compensate for the forces acting on the bar in operation so that each of such bars will be substantially straight throughout the bottom portions of its rotation.

A transverse support member 67 is welded, as indicated at 67a, or otherwise secured between a pair of opposed depending arms 68 which are in turn welded, as indicated at 68a, to carrying members 14 and 15 near the forward ends thereof as shown in Fig. 1. A shaft housing 71 is adjustably secured to the underside of support member 67 by a pair of bolts 69 which are engageable with elongated slots 70. Such housing rotatably supports a shaft 72 which projects forwardly from such housing. Shaft 72 is connected by a universal joint 75 to an extension shaft 74 which, in turn is connected in conventional fashion to the power-take-off shaft of the tractor (not shown). A V-pulley 73 is mounted on the rear end of shaft 72 and a V-belt 76 is trained over pulley 73 and the V-shaped groove 57 of disc 41. Thus power from the tractor is utilized to rotate the raking cylinder 40. Tensioning of belt 76 is simply effected by lateral shifting of shaft housing 71, slots 70 permitting such adjustment. A guard 82 comprising a plate provided with a forwardly and upwardly sloping end 82a is welded, as indicated at 82b, to a depending bracket 83 welded, as indicated at 83a, to housing 71 for protection of the drive connection.

A plurality of hay strippers 77 are mounted on frame 10. A horizontal tubular support arm 78 is utilized for such purpose and such arm is secured in depending relationship to carrying supports 14 and 15 by a pair of plate members 79. Such plate members are secured respectively to carrying members 14 and 15 in depending relation by bolts 79a. The lower ends of such plates are shaped to partially surround tubular arm 78 and such arm is welded to each of the plates 79 and 80. A vertically disposed plate 81 is welded, as indicated at 81a, to the forward edge of tubular arm 78 as shown in Figs. 1 and 3. The hay strippers 77 are secured in spaced and depending relationship to plate 81 by bolts 82 and each hay stripper comprises a tubular member provided with a closed curved end portion 77a which projects between tines 62 of teeth 60 and extend underneath raking cylinder 40, as shown in Figs. 1 and 3, as closely as possible to the path of the rotating rake bars 43.

In the operation of the side delivery rake of this invention, the carrying members 15 and 14 are mounted on the draft links 16 and 17 of the tractor and connection of the tractor top link 35 is made to the top of A-frame member 34. Thus, the front end of the rake is supported on the tractor and the rear end of the side delivery rake is supported by the wheels 28. When the power-take-off shaft of the tractor is driven, disc 41 is rotated by means of belt 76 which then effects rotation of the entire raking cylinder 40. Due to the angular disposition of the rake bars relative to the direction of travel of the tractor, the rake teeth 60 have an effective movement relative to the ground in a direction substantially transverse to the tractor travel, thereby advancing the hay towards one end of the rake. The height of the rake teeth 60 with respect to the ground may be readily varied by raising or lowering hitch links 16 and 17. When the raking cylinder is rotating rapidly the center of rake bars 43 (Fig. 7) tends to be displaced radially outwardly hence downwardly as each rake bar approaches the bottom portions of its rotary path due to the combination of centrifugal and gravity forces acting on the unsupported central portions of the rake bars. The camber imparted to the rake bars is selected to substantially neutralize such deflection, so that the rake bars remain substantially straight at the bottom portions of their rotation and there will be no interference with the hay strippers.

From the foregoing description, it will be apparent that there is here provided a side delivery rake of relatively simple rugged construction employing a comparatively small number of parts thereby insuring that such rake may be economically fabricated and will be relatively free from mechanical failures. The cambered rake bars provided by this invention substantially eliminate any possibility of interference between the rake bars and the hay strippers and thereby overcome a common weakness of prior side delivery rakes.

It will, of course, be understood that many details of construction may be varied through a wide range without departing from the principles of this invention and it is, therefore, not the purpose to limit the patent granted hereon otherwise than necessitated by the scope of the appended claims.

I claim:

1. A side delivery rake comprising a bottom frame element of substantially C-shaped configuration in a horizontal plane, an inverted U-shaped upright frame element having its ends respectively secured to spaced regions of said bottom frame element, a generally horizontal stub axle mounted on the medial portion of each upright arm of said inverted U-shaped upright frame element, each of said axles being parallel to the other and projecting into the space defined by said bottom and upright frame elements, and a raking cylinder having its opposed head members respectively rotatably journaled on said stub axles.

2. A side delivery rake for use with a tractor having trailing hitch links, comprising a bottom frame element of substantially C-shaped configuration in a horizontal plane, an inverted U-shaped upright frame element having its ends respectively secured to spaced regions of said bottom frame element, a pair of laterally spaced, forwardly converging, substantially inverted U-shaped carrying members disposed substantially transversely of said upright frame element, said carrying members being secured at one end to the trailing edge of said bottom frame element and having their bight portions secured to said upright frame element, means on the converging ends of said carrying members adapted for connection to said tractor hitch links, a generally horizontal stub axle mounted on each upright arm of said inverted U-shaped upright frame element, each of said stub axles being parallel to the other and projecting into the space defined by said bottom and upright frame elements, and a raking cylinder having its opposed head members respectively rotatably journaled on said stub axles.

3. A side delivery rake for use with a tractor having trailing hitch links, comprising a bottom frame element of substantially C-shaped configuration in a horizontal plane, an inverted U-shaped upright frame element having its ends respectively secured to spaced regions of said bottom frame element, a pair of laterally spaced forwardly converging substantially inverted U-shaped carrying members disposed substantially transversely of said upright frame element, said carrying members being secured at one end to the trailing edge of said bottom frame element and having their bight portions secured to said upright frame element, means on the forward ends of said carrying members adapted for connection to said tractor hitch links, a rearwardly projecting arm secured to each of said carrying members, each of said arms having a vertical hub on the end thereof, a fork journaled in each of said hubs, and a wheel rotatably mounted in each of said forks.

4. A side delivery rake for use with a tractor having trailing hitch links, comprising a bottom frame element of substantially C-shaped configuration in a horizontal plane, an inverted U-shaped upright frame element having its ends respectively secured to spaced regions of said bottom frame element, a pair of laterally spaced, forwardly converging substantially inverted U-shaped carrying members disposed substantially transversely of said upright frame element, said carrying members being secured at one end to the trailing edge of said bottom frame element and having their bight portions secured to said upright frame element, a rearwardly projecting arm secured to each of said carrying members, each of said arms having a vertical hub on the end thereof, a fork journaled in each of said hubs, a wheel rotatably mounted in each of said forks, a vertical A-frame member secured to the converging ends of said carrying members, means on said A-frame member adapted for connection to said tractor hitch links, a pair of opposed braces having ends secured respectively to said A-frame member and said carrying members, a generally horizontal stub axle mounted on each upright arm of said inverted U-shaped upright frame element, each of said stub axles being parallel to the other and projecting into the space defined by said bottom and upright frame elements, and a raking cylinder having its opposed head members respectively rotatable journaled on said stub axles.

5. A side delivery rake comprising a bottom frame element of substantially C-shaped configuration in a horizontal plane, an inverted U-shaped upright frame element having its ends respectively secured to spaced regions of said bottom frame element, a plurality of laterally spaced arched carrying members disposed substantially transversely of said upright frame element, said carrying members having their rear ends secured to said bottom frame element and having their medial portions secured to said upright frame element, means on the forward ends of said carrying members adapted for connection to a tractor, a generally horizontal stub axle mounted on each upright arm of said inverted U-shaped upright frame element, each of said stub axles projecting into the space defined by said bottom and upright frame elements, and a raking cylinder having its opposed head members respectively rotatably journaled on said stub axles.

CLARENCE B. RICHEY.

References Cited in the file of this patent

UNITED STATES PATENTS

| Number | Name | Date |
|---|---|---|
| 2,511,894 | Altgelt | June 20, 1950 |